United States Patent [19]

Weisse

[11] Patent Number: 5,070,673
[45] Date of Patent: Dec. 10, 1991

[54] TETRAHEXAGONAL TRUSS STRUCTURE

[75] Inventor: Dick O. Weisse, Camarillo, Calif.

[73] Assignee: Tetrahex, Inc., Camarillo, Calif.

[21] Appl. No.: 266,386

[22] Filed: Nov. 2, 1988

[51] Int. Cl.$^5$ .............................................. B32B 3/12
[52] U.S. Cl. ...................................... 52/808; 52/648;
428/116; 428/118
[58] Field of Search .................. 52/86, DIG. 10, 806,
52/808, 648; 428/116, 118; 449/44, 60

[56] References Cited

U.S. PATENT DOCUMENTS

| | | | |
|---|---|---|---|
| 2,331,231 | 10/1943 | Foot et al. | 449/44 |
| 2,682,235 | 6/1954 | Fuller . | |
| 3,058,550 | 10/1962 | Richter . | |
| 3,209,507 | 10/1965 | Dresser et al. . | |
| 3,254,459 | 6/1966 | Bodley . | |
| 3,354,591 | 11/1967 | Fuller . | |
| 3,415,027 | 12/1968 | Snyder et al. . | |
| 3,642,566 | 2/1972 | Figge . | |
| 3,645,833 | 2/1972 | Figge . | |
| 3,849,237 | 11/1974 | Zetlin . | |
| 3,906,571 | 9/1975 | Zetlin . | |
| 3,914,486 | 10/1975 | Borgford . | |

FOREIGN PATENT DOCUMENTS

601957  5/1948  United Kingdom .................. 52/808

Primary Examiner—Michael Safavi
Attorney, Agent, or Firm—Koppel & Jacobs

[57] ABSTRACT

A lightweight, high strength moldable structure is comprised of a core having a plurality of interconnected cavities. Each solid-walled cavity has a hexagonal base so that the core of the structure has upper and lower surfaces. Each solid-walled cavity has a unique tetrahexagonal shape in which a regular tetrahedron is located on top of and integrated with a hexagonal base. The walls of the cavities may be solid or they may be defined by a series of support struts for an even lighter weight structure. The upper and lower surfaces may be covered by skins, making it suitable for boat hulls, vacuum chambers, and aircraft.

9 Claims, 11 Drawing Sheets

TETRAHEXAGONAL TRUSS STRUCTURE

BACKGROUND OF THE INVENTION

1. Field of the Invention

This invention relates to truss structures of the honeycomb type.

2. Description of the Prior Art

A number of honeycomb structures are known that may be used as support walls, building enclosures and roofs. For example, U.S. Pat. No. 3,642,566 issued Feb. 15, 1972 to Figge and U.S. Pat. No. 3,645,833 issued Feb. 29, 1972 to Figge illustrate a truss structure having tetrahedron-shaped elements. U.S. Pat. No.'s 3,849,237 issued Nov. 19, 1974 to Zetlin and 3,906,571 issued Sept. 23, 1975 to Zetlin disclose structures having tetrahedron-shaped modular sections made of sheet metal that are bonded together. Also, U.S. Pat. No. 3,914,486 issued Oct. 21, 1975 to Borgford discloses a structure made of three-sided half cubes that are interconnected by their bases.

The primary disadvantage of many prior art structures is that they are difficult to mold and thus are expensive to manufacture. Another disadvantage is that they often may be made only in sheets, and cannot be easily formed or bent into other shapes.

A disadvantage of the more light weight prior art truss structures is that they are not real strong and cannot be twisted or compressed without damage to the structure. Stresses placed at one point of such structures are not adequately distributed throughout the structure, resulting in structural failures.

SUMMARY OF THE INVENTION

The present invention overcomes the problems with the prior art by providing a strong lightweight truss structure that can easily be molded, and may be formed into flat, circular or other curved shapes.

Another feature and advantage of the truss structure according the present invention is that stresses placed at any point in the structure are distributed throughout the structure for added strength.

Another feature and advantage of the present invention is that the dies used to make the structure having solid walls may be easily and inexpensively manufactured from hexagonal bar stock.

These and other features and advantages of the present invention are realized in a lightweight, novel and unique high-strength truss structure having a core comprised of a plurality of interconnected cavities with solid walls, each cavity having a hexagonal base. The upper and lower outer surfaces of the core have a plurality of hexagonal-shaped bases connected in a honeycomb array arrangement. Each cavity in the core has a unique tetrahexagonal shape in which a hexagonal base and its side walls are integrated with the base and side walls of a three-sided tetrahedron or pyramid shape. The tetrahexagonal cavity has three parallelogram-shaped side walls. One vertex of each parallelogram-shaped side wall intersects with a corresponding vertex of the other two parallelograms to create the apex of the tetrahedron; the opposing vertex of each parallelogram intersects one of the six vertices of the hexagonal base. The other six sides of the tetrahexagonal-shaped cavity are optional right triangles that are arranged into pairs having a common first triangle edge. A second triangle edge of each triangle is also an edge of the hexagonal base. The third triangle edge of each triangle is also an edge of a parallelogram side wall.

The walls of the cavities may be solid, or they may be defined by a series of parallelogram struts for an even lighter weight structure. Horizontal support struts may be added for increased strength.

The core may be shaped into circular, flat or curved forms. The upper and lower honeycomb array surfaces of the core may optionally be covered by skins to form a solid panel. The structure with the skins is suitable for any application where lightweight, strength, and compressibility are desired, including aircraft, boat hulls, rocket walls, and vacuum chambers.

A major advantage of the truss structure is that it may be molded. To make the structure that has solid cavity walls, two opposing plates are brought close together, each plate having an array of adjacent dies extending from its face. Each die has a tetrahexagonal shape corresponding to the tetrahexagonal-shaped cavities discussed above. The hexagonal bases of the dies are affixed to the plates. The apices of the tetrahexagonal dies on each plate are moved close to and aligned with the complementary cavities between the dies in the opposing plate. A core material such as molten plastic flows between the opposing dies of the two plates to form a truss structure having solid walls. Skins may then be attached to the upper and lower honeycomb surfaces of the core.

To make the truss structure having parallelogram struts that define hollow parallelogram side walls instead of solid cavity walls, the opposing dies are positioned so that their opposing walls actually touch each other. However, the edges of the dies are milled down so that molten plastic flows between adjacent opposing dies into the voids left by the milled-away portions of the edges. This results in a parallelogram strut being formed at each place where three flat surfaces would otherwise intersect in the solid cavity wall embodiment. Additional horizontal support struts may be made by forming horizontal grooves in the three parallelogram-shaped side walls—except on the outside walls of the dies on the perimeter of the mold array—so that each horizontal groove joins the two opposing parallelogram vertices in each parallelogram wall that are closest together. Plastic flows into the grooves to form the horizontal struts. The strut structure having horizontal struts is particularly strong because the horizontal and parallelogram struts meet to form twelve-point hubs from which struts radiate in twelve directions. The twelve-point hub structure provides maximum stability and assures that a load applied to any part of the structure is distributed throughout the entire truss structure.

The solid cavity wall embodiment of the present invention may also be drawn or stamped from metal because the entire surface area of each cavity is the same as its outer surface area; there is no additional surface area in the interior of any cavity.

These and other features and advantages of the invention will be apparent to those skilled in the art from the following detailed description of preferred embodiments, taken together with the accompanying drawings, in which:

DESCRIPTION OF THE PREFERRED EMBODIMENTS

Figure 1:
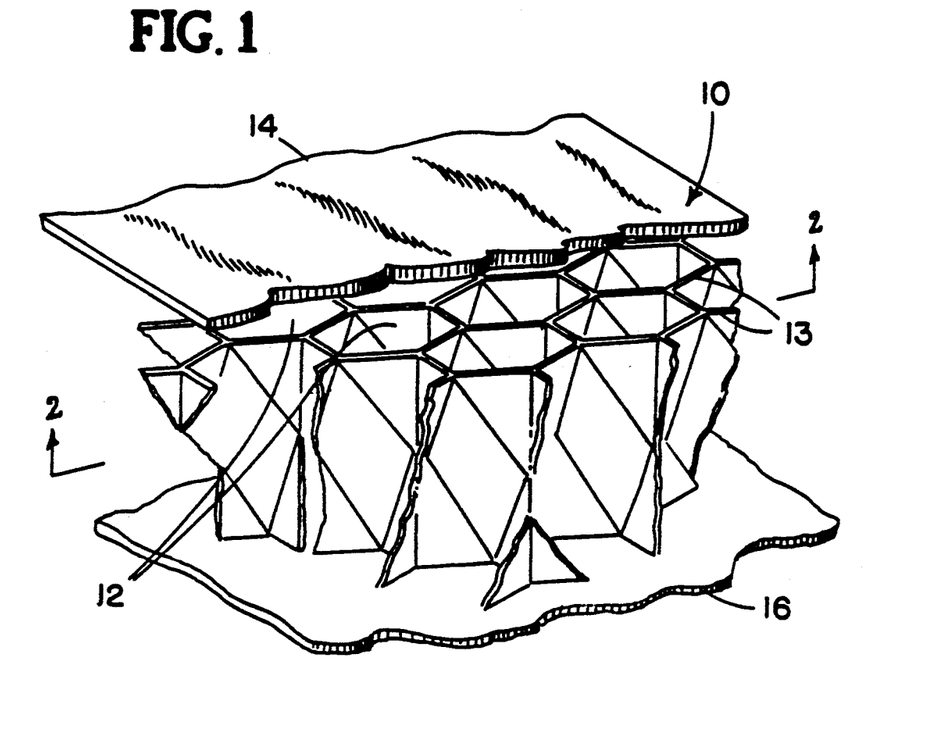
FIG. 1 is a fragmentary perspective view of a first embodiment of the truss structure according to the present invention having solid planar side walls.

FIG. 1 is a fragmentary perspective view of a first embodiment of a truss structure according to the present invention. In FIG. 1 truss structure 10 is comprised of an array of adjacent cavities 12 arranged in a honeycomb fashion. Each cavity is defined by a plurality of solid planar side walls 13 as further discussed below. The honeycomb cavities are covered by an upper skin 14 and a lower skin 16 to form a solid planar structure 10. Skins 14 and 16 are glued to the upper and lower honeycomb surfaces of the structure to form solid planar surfaces. The core comprised of adjacent cavities 12 may be used in any application where compressibility and lightweight strength are required, including boat hulls, aircraft, and vacuum chambers. The core depicted in FIG. 1 can be bent only to a limited extent.

Figure 2:
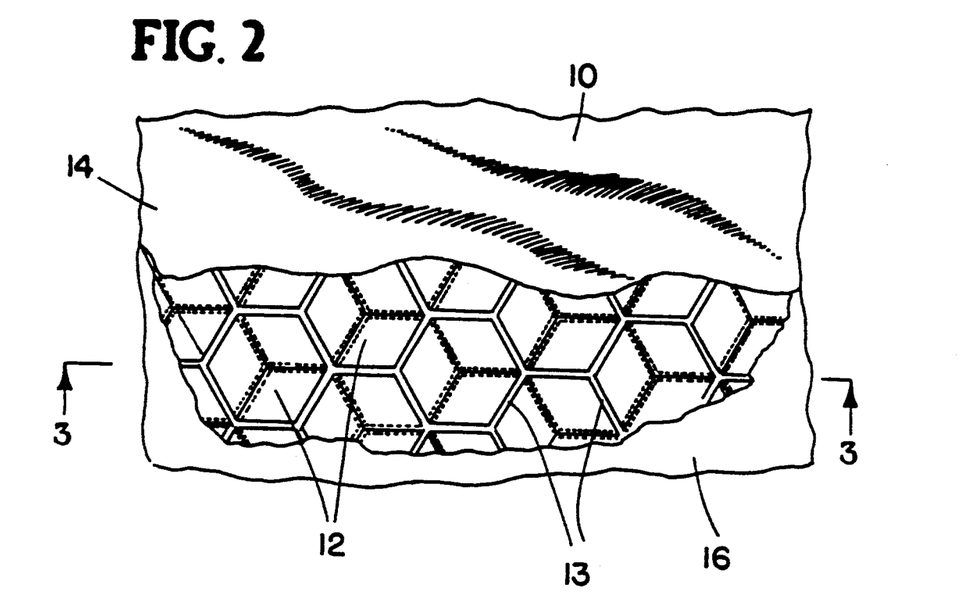
FIG. 2 is a fragmentary top view of the first embodiment of the truss structure.
Figure 3:
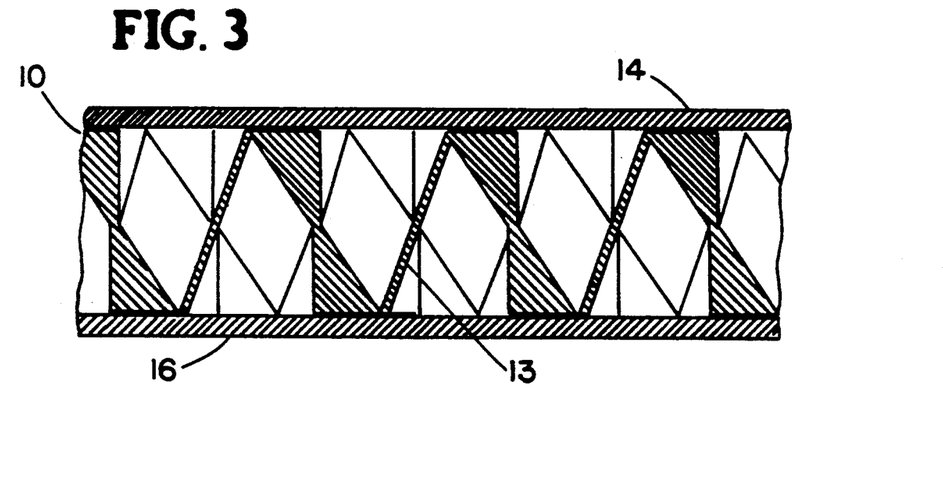
FIG. 3 is a side sectional view of the truss structure taken along the line 3—3 of FIG. 2.

FIGS. 2 and 3 also depict the first embodiment of structure 10 shown in FIG. 1. FIG. 2 is a fragmentary top view of the structure showing the honeycomb upper surface of the structure's core where the hexagonal bases of cavities 12 are interconnected to form the upper surface of the core. FIG. 3 is a side-sectional view of structure 10, taken along line 3—3 of FIG. 2. Side walls 13 define cavities 12, which in turn are covered by an upper skin 14 and a lower skin 16.

The core is comprised of a plurality of adjacent tetrahexagonal cavities arranged in a honeycomb array to form upper and lower array surfaces. Each cavity is essentially a tetrahedron, having tetrahedron edges, that is located on top of and integrated with a hexagonal base having six base vertices and six base edges. The apex of the tetrahedron coincides with the apex of the cavity. The cavity has three parallelogram-shaped side walls and six optional triangular side walls. Each parallelogram wall has four parallelogram vertices and four parallelogram edges. Each triangle has three triangle vertices and three triangle edges.

If the optional triangular walls are not used, the core may be easily bent. Also, such a core may be stamped or drawn from a metal like aluminum. The base of such a cavity will have three base vertices and three base edges.

For each parallelogram-shaped wall of the cavity, one parallelogram vertex intersects the apex of the cavity. Thus, three parallelogram vertices create the cavity apex. The opposing parallelogram vertex in each parallelogram wall intersects a vertex of the hexagonal base.

The optional six triangle walls are arranged in pairs between adjacent parallelogram walls. Each pair of triangle walls has a first common triangle edge. For each triangle, a second triangle edge is also a base edge, and the third triangle edge of each triangle is also a parallelogram edge.

The shape of the cavities is substantially the same as the shape of the walls of the tetrahexagonal dies discussed below in connection with FIG. 6 for the core structure having triangular walls.

Skins may be applied to the upper and lower honeycomb surfaces of the core after the core has been created.

Figure 4:
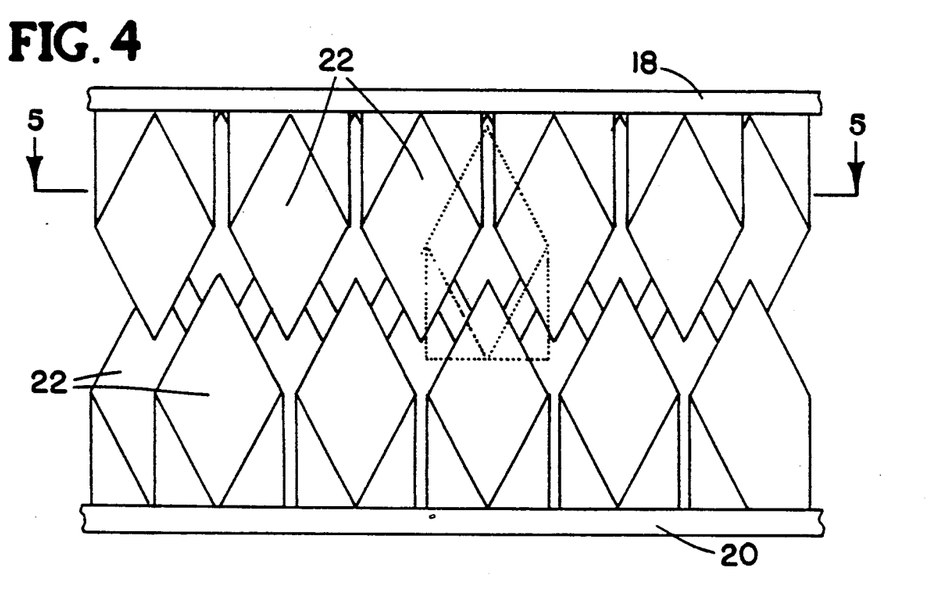
FIG. 4 is a side view of the upper and lower die arrays used to make the first embodiment of the truss structure.
Figure 5:
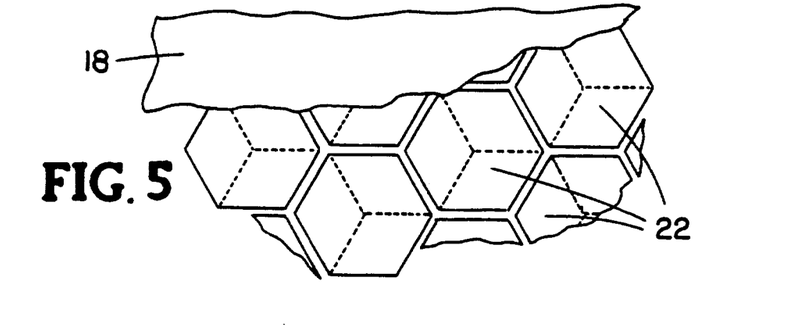
FIG. 5 is a top view of the upper die array in FIG. 4, taken along line 5—5.

Referring to FIG. 4, structure 10 is preferably formed by a molding, drawing or stamping process in which an upper array of adjacent tetrahexagonal dies 22 attach to an upper plate 18 are aligned with and moved close to a similar lower array of dies 22 attached to a lower plate 20. If a molding process is used, molten plastic flows in the space between the upper and lower dies 22 to form the core of the structure. If the structure is drawn or stamped from metal, a metal sheet is placed over lower dies 22 and is shaped by the downward force of dies 22 attached to upper plate 18. The top view of the dies 22 attached to upper plate 18 is shown in FIG. 5.

To make the solid planar wall core without triangular walls, adjacent dies 22 on the same plate are arranged to touch each other so that no plastic flows between them. Plastic only flows between dies on different plates.

The structure is manufactured using a series of substantially identical dies 22 having a unique shape. Each die has a tetrahexagonal shape in which a tetrahedron (pyramid) is integrated with a hexagonal base and its side walls. FIGS. 6 through 10 are various views of this die. In FIG. 6, die 22 is comprised of a tetrahedron having an apex 30 and parallelogram-shaped walls 26. Hexagonal base 24 and its six triangular side walls 28 are integrated with the tetrahedron and its three parallelogram-shaped walls 26 to form the tetrahexagonal shape. The apex of the tetrahedron coincides with the apex of the die. The apex is located on the opposite end of the die from the base.

Figure 6:
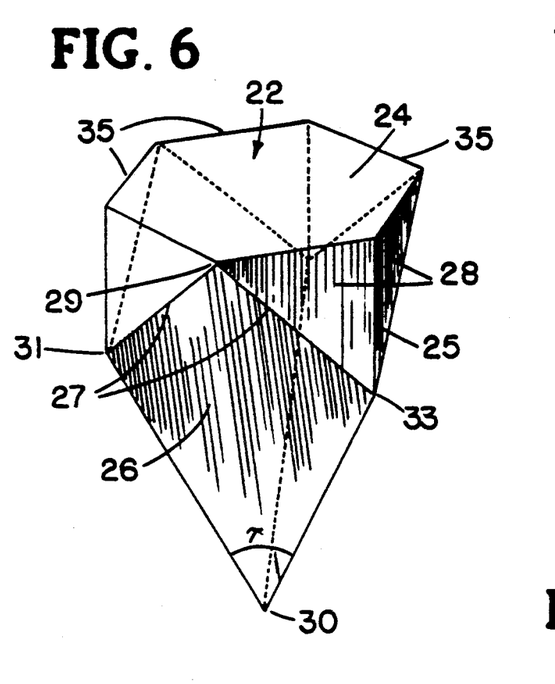
FIG. 6 is a diagrammatic view of a single die used to make the first embodiment of the truss structure.

As depicted in FIG. 6, die 22 has three parallelogram walls 26, each of which has four parallelogram edges 27 and four parallelogram vertices 29, 30, 31 and 33. Vertex 30 of each parallelogram wall intersects the apex. The opposing parallelogram vertex 29 intersects a vertex of hexagonal base 24.

Die 22 also has six triangular walls 28 which are arranged into pairs. Each triangular wall 28 has three triangle edges 25, 27 and 35. Each pair of walls 28 has a common first triangle edge 25. Each triangular wall 28 has a second triangle edge 35 that is also a base edge, and a third triangle edge 27 that is also a parallelogram edge.

The apex angle $\tau$ is preferable 60° so that the top portion of the tetrahexagonal die is a regular tetrahedron. However, the apex angle $\tau$ may be varied from 0° to 120°. All of the other angles of the die are determined by the choice of the apex angle. The volume of the die and thus of the truss structure is determined by the distance between the apex and the base of the die and its apex angle.

Figure 7:
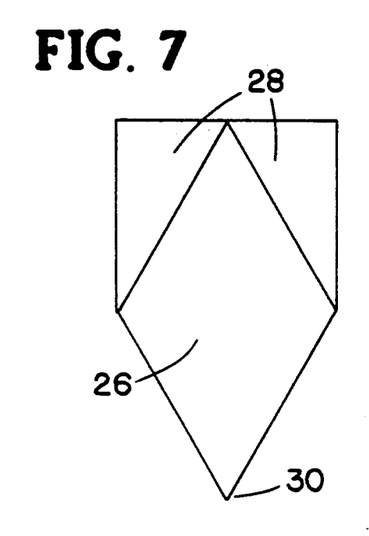
FIG. 7 is a side view of the die in FIG. 6 depicting a parallelogram face and two triangular walls.
Figure 8:
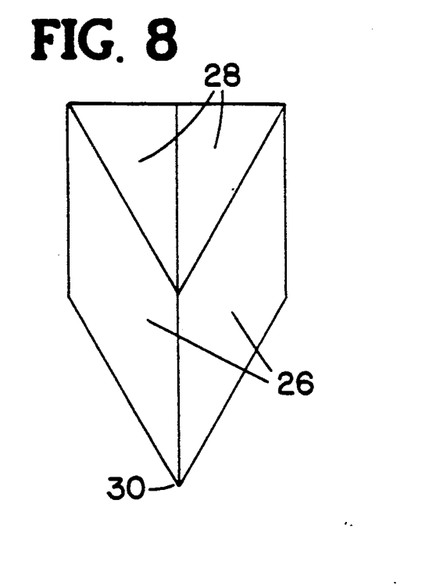
FIG. 8 is a second side view of the die in FIG. 6 depicting two parallelogram walls and two triangular walls.
Figure 9:
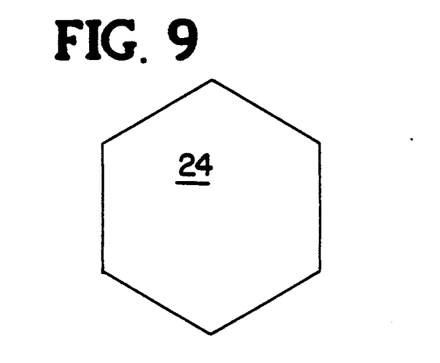
FIG. 9 is a bottom view of the die depicted in FIG. 6 showing the hexagonal base.
Figure 10:
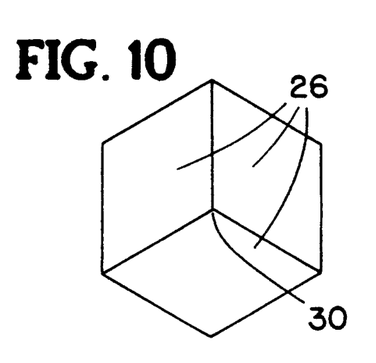
FIG. 10 is a top view of the die depicted in FIG. 6 showing the apex at the center of the drawing.

FIGS. 7 and 8 are two different side views of the die depicted in FIG. 6. The side view depicted in FIG. 7 shows a single parallelogram wall 26 and two right triangular walls 28. The second side view depicted in FIG. 8, taken from a different angle, shows two parallelogram-shaped walls 26 and two right triangular walls 28. FIG. 9 is a bottom view of die 22 showing the hexagonal base. FIG. 10 is a top view of die 22 depicting the meeting of the three parallelogram walls 26 at a single point, namely apex 30.

Die 22 may be made from a piece of hexagonal bar stock in which three cuts are made to create the parallelogram side walls 26. The cuts are made so that these parallelogram walls meet at apex 30.

Instead of having solid planar side walls, the truss structure according to the present invention may be comprised of parallelogram struts forming hollow parallelogram-shaped walls to make an even more lightweight structure. The parallelogram struts are formed by milling down the parallelograms' edges of the tetrahexagonal die 22 depicted FIGS. 6 through 10, so that spaces are formed between adjacent edges when three dies meet during the molding process. Molten plastic flows through the gaps formed by the meeting of three milled down parallelogram edges to form the parallelogram struts. Although the second embodiment having parallelogram struts is much lighter than the first embodiment described above having solid planar walls, the strut embodiment is more difficult to mold. The solid planar wall core is much stronger than the core comprised of struts.

Figure 28A:
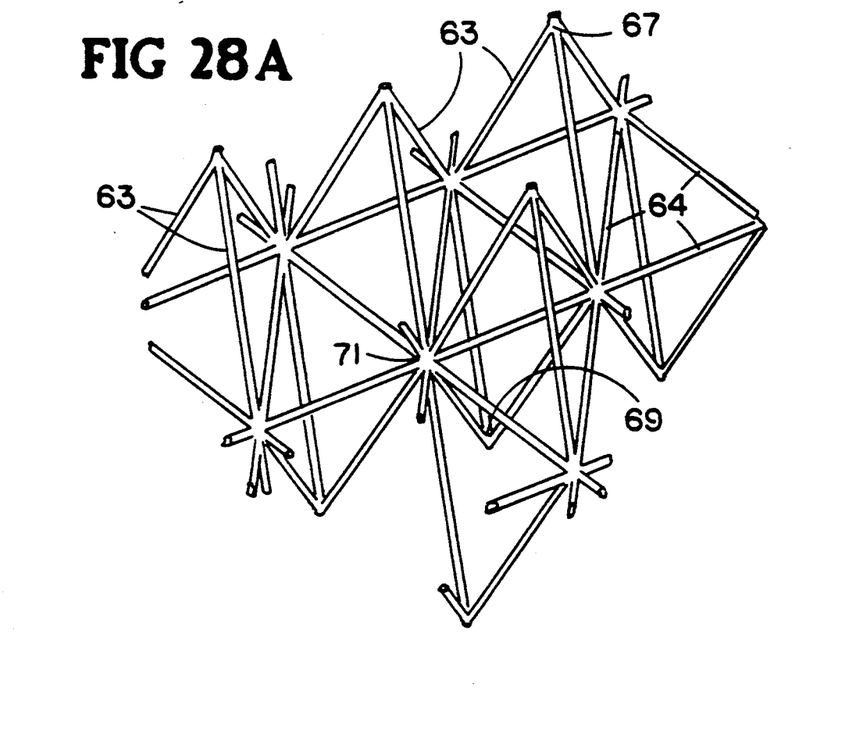
FIG. 28A depicts the core structure having hollow parallelogram walls defined by parallelogram struts.

FIG. 28A depicts a core according to the present invention having adjacent cavities arranged to form upper and lower array surfaces. Each cavity has three hollow side walls defined by parallelogram struts 63 and optional horizontal struts 64. Each cavity has an apex 67 on the opposite end of the cavity from the base. The cavity is a tetrahedron integrated with a base having at least three base vertices 69 such that three hollow walls defined by parallelogram struts 63 are parallelograms. Each parallelogram wall has four parallelogram vertices, with a first parallelogram vertex of each parallelogram wall intersecting apex 67. A second opposing parallelogram vertex of each parallelogram intersects a base vertex 69. Optional horizontal struts 64 may be used which, with parallelogram struts 63, create 12-point hubs 71 for added strength. Horizontal struts 64 join the third and fourth opposing parallelogram vertices of each parallelogram.

Figure 28B:
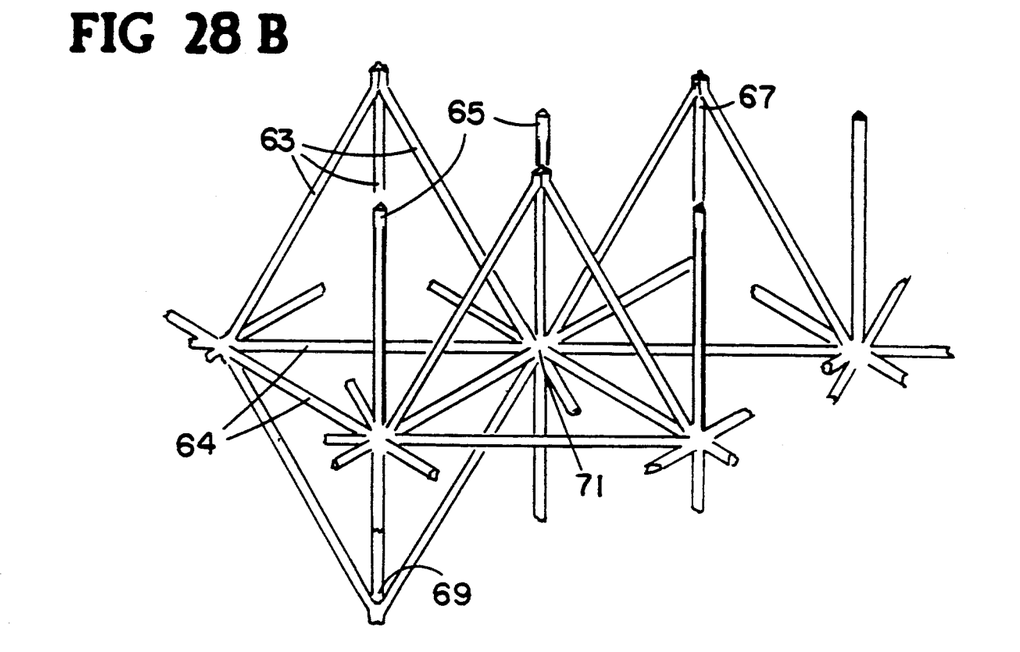
FIG. 28B depicts the core structure of FIG. 28A having additional triangle struts.

FIG. 28B depicts the core of FIG. 28A except that triangle struts 65 have been added. Triangle struts 65 are optional, but if they are used a hexagonal base having six base vertices is created. Adjacent base vertices may be connected by base struts (not shown). Triangle struts 65 are created if the first triangle edges discussed above are milled down.

If triangle struts 65 are used, six additional hollow triangle walls are created in the cavity, each triangular wall being defined by two triangle struts and a base vertex. These six triangle walls are arranged in pairs such that each pair has a common first triangle strut 65, and the second triangle strut of each triangular wall is also a parallelogram strut.

Figure 11:
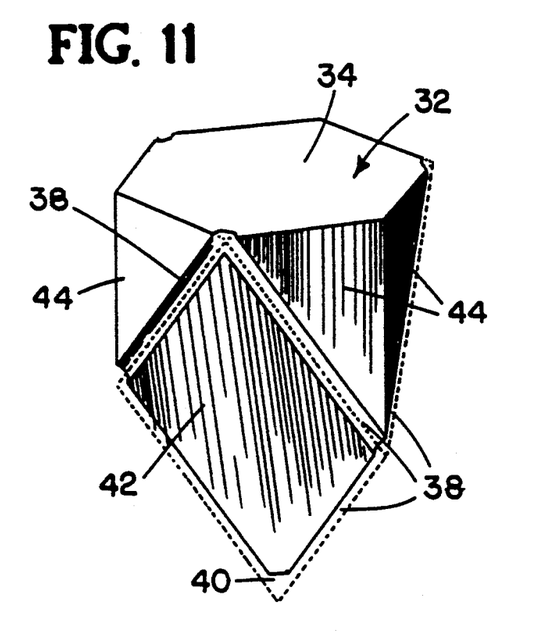
FIG. 11 is a diagrammatic view of a die according to a second embodiment of the present invention, the die having milled parallelogram edges for making the parallelogram struts.
Figure 12:
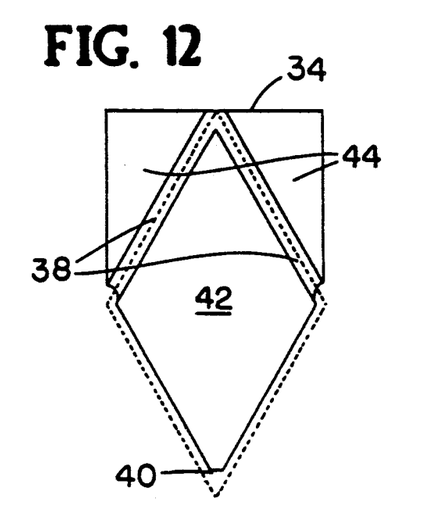
FIG. 12 is a side view of the die depicted in FIG. 11 showing a parallelogram wall and two triangular walls.
Figure 13:
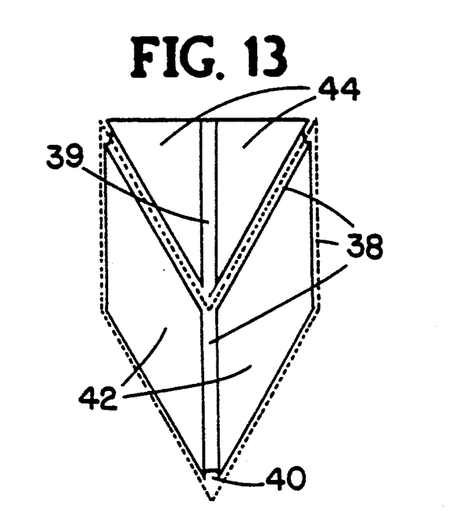
FIG. 13 is a second side view of the die depicted in FIG. 11 showing two parallelogram walls and two triangular walls and also having optional milled triangle edges 39.

FIGS. 11 through 15 depict different views of the tetrahexagonal die used to form the second embodiment of the truss structure having parallelogram struts. The diagrammatic view of die 32 in FIG. 11 depicts milled edges 38 formed between parallelogram walls 42 and the right triangular walls 44. FIGS. 12 and 13 depict two different side views of the die shown in FIG. 11. The side view shown in FIG. 12 depicts a parallelogram wall 42 whose milled parallelogram edges 38 meet right triangular side walls 44. The die apex 40 is also milled down. The second side view depicted in FIG. 13 shows two parallelogram walls 42 and two right triangular walls 44. The walls meet in milled parallelogram edges 38.

Figure 14:
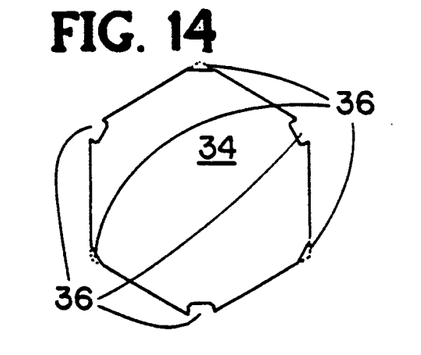
FIG. 14 is a bottom view of the die depicted in FIG. 13 showing the hexagonal base with milled vertices.
Figure 15:
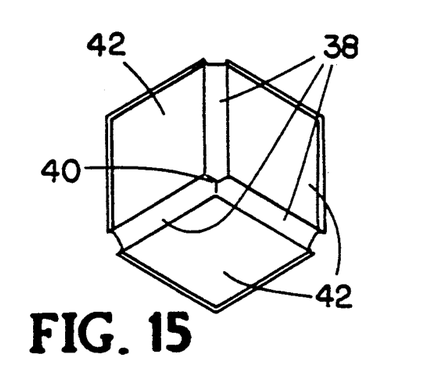
FIG. 15 is a top view of the die depicted in FIG. 11 with the apex at the center of the drawing.

FIGS. 14 and 15 depict bottom and top views of die 32, respectively. In FIG. 14, hexagonal base 34 has milled vertices 36 used to form the optional triangle struts. The top view of FIG. 15 depicts the meeting of three parallelogram walls 42 at apex 40.

Figure 16:
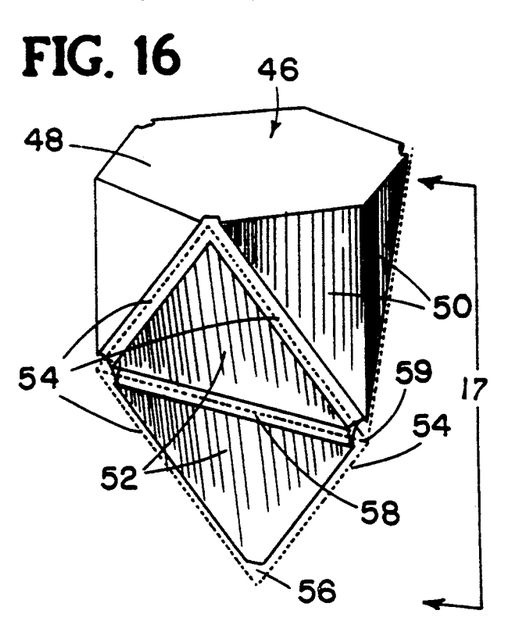
FIG. 16 is a diagrammatic view of a die according to a third embodiment of the present invention, the die having milled parallelogram edges and horizontal grooves for making the parallelogram and horizontal support struts.

The second strut embodiment depicted in FIGS. 11 through 15 may be modified to include additional horizontal struts for added strength. The die used to create the third embodiment having parallelogram and horizontal struts is depicted in FIGS. 16 through 20. In FIG. 16, die 46 has parallelogram struts 54 and horizontal struts 58. Horizontal struts 58 are formed across the parallelogram walls 52 so that each horizontal strut 58 joins the two opposing vertices of parallelogram wall 52 which are closest together. All parallelogram side walls of the dies have horizontal struts except for those on the perimeter of the array of dies used to form each mold section. These peripheral parallelogram side walls remain flat so that the cores made by two adjacent mold sections may be glued together. The horizontal struts are formed by placing horizontal grooves in the parallelogram side walls.

The use of horizontal and parallelogram struts creates a twelve-point hub 59 when two adjacent dies with milled edges and horizontal grooves are adjacent to each other. Plastic flowing from this twelve-point hub radiates in twelve directions so that twelve parallelogram and horizontal struts are made that meet at the hub. The use of twelve point hubs achieves optimal strength and distributes any stress placed on the structure for increased durability and compressibility.

Figure 17:
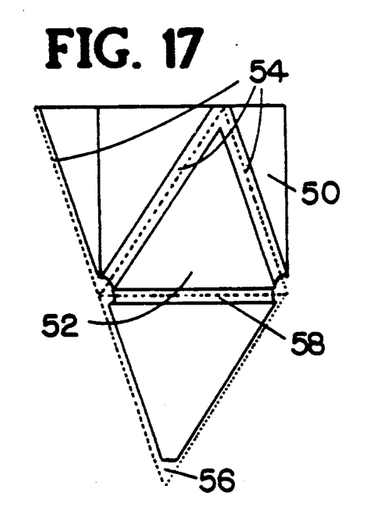
FIG. 17 is a side view of the die of FIG. 16 taken along line 17—17.
Figure 18:
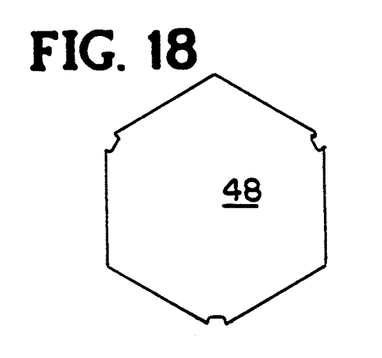
FIG. 18 is a bottom view of the base of the die depicted in FIG. 16 showing the hexagonal base.

FIG. 17 is a side view of the diagrammatic view of the die in FIG. 16. In FIG. 17 parallelogram struts 54 define the boundaries between triangular walls 50, as well as between triangular walls 50 and parallelogram walls 52. Apex 56 of the die is milled down to aid in the forming of the support struts. FIG. 18 is a bottom view of die 46 showing the hexagonal base 48.

Figure 19:
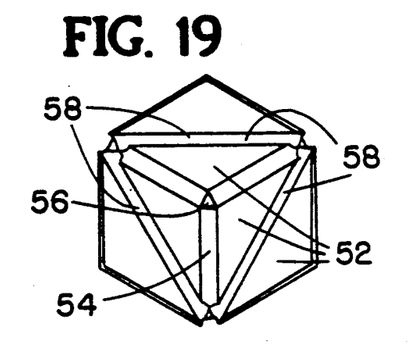
FIG. 19 is a top view of the die depicted in FIG. 16 with the milled apex at the center.
Figure 20:
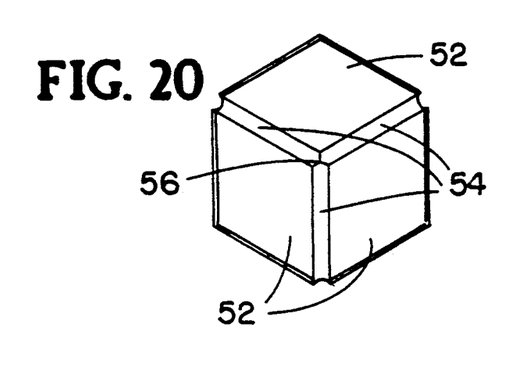
FIG. 20 is a top view of the die depicted in FIG. 16 excluding the horizontal support struts.

FIGS. 19 and 20 are top views of the die with the milled apex 56 at the center of the drawings. FIG. 19 differs from FIG. 20 in that FIG. 19 depicts horizontal struts 58 whereas FIG. 20 omits them. It is apparent from FIG. 19 that horizontal struts 58 will significantly increase the compressible strength of the structure when a force is placed upon apex 56 or base 48.

Figure 21:
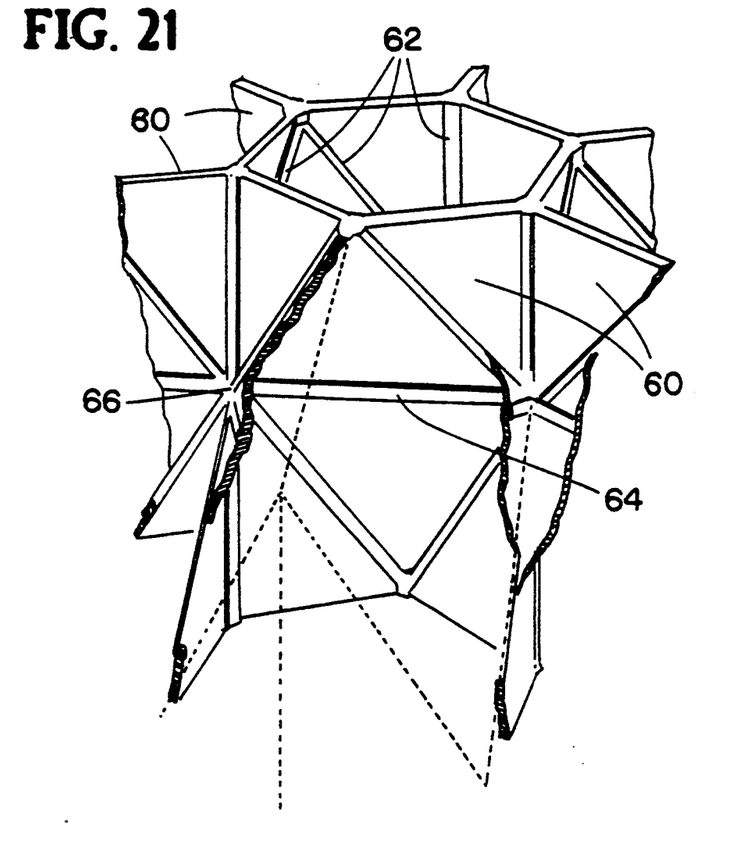
FIG. 21 is a fragmentary perspective view of a fourth embodiment of the truss structure having solid planar side walls as well as parallelogram and horizontal support struts.

FIG. 21 is a fragmentary perspective view of a fourth embodiment of the truss structure having solid planar side walls 60 as well as parallelogram support struts 62 and horizontal struts 64. The structure depicted in FIG. 21 has maximum strength due to the combination of both solid side walls, parallelogram struts, and horizontal struts. It is also heavier than the other embodiments of the invention.

Figure 22:
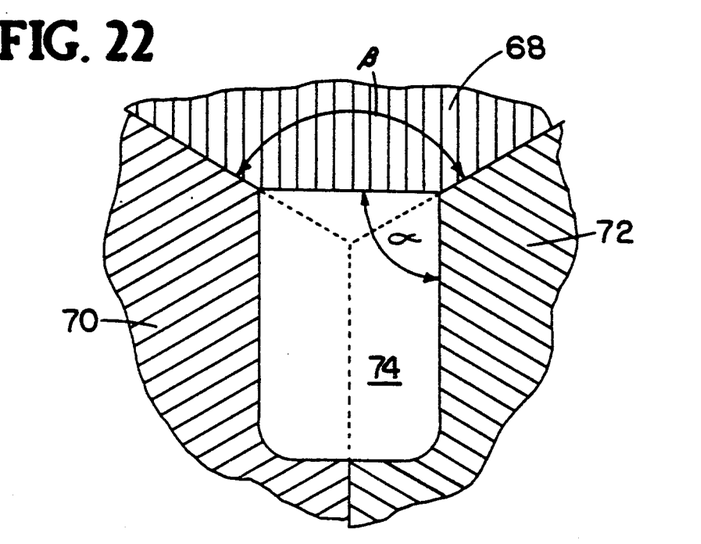
FIG. 22 is a drawing depicting the meeting of three milled edges used to form a parallelogram strut.

Each parallelogram strut is formed by the meeting of three parallelogram edges from three different dies. One of these dies is from one die array, and two of the dies are from the other die array. The cross-sectional shape of the parallelogram strut must be chosen so that the molds containing the die arrays are able to separate after the strut has been formed from molten plastic. FIG. 22 depicts three dies 68, 70 and 72 having milled parallelogram edges which form a parallelogram strut 74 when the three milled edges meet. In FIG. 22, die 68 is from one die array, and dies 70 and 72 are from the other die array. To permit the molds to separate, the angle $\beta$ must be chosen so that it is less than 120° and the angle $\alpha$ should typically be less than or equal to 90°. The angle $\beta$ should be 120° if the die bases are regular hexagons. If angle $\alpha$ is greater than 90°, the molds may separate but the core will stick in one mold.

Figure 23:
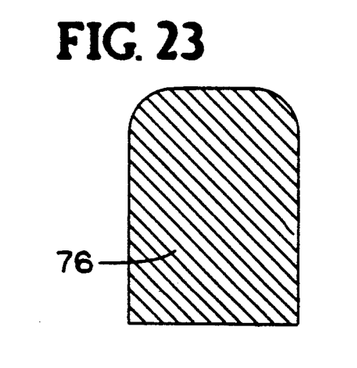
FIG. 23 is a cross-sectional view of a preferred shape for a parallelogram strut.

FIG. 23 depicts a preferred cross-sectional shape of a parallelogram strut. In FIG. 23, parallelogram strut 76 has two rounded corners, and two corners which form 90° angles. If strut 76 had a round shape, the condition that $\alpha$ is less than 90° would not be met, and the molds would not easily separate.

Figure 24:
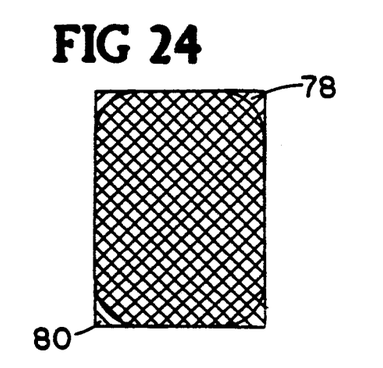
FIG. 24 is a top view of the meeting of two parallelogram struts, one parallelogram strut having the shape depicted in FIG. 23 and being made by the lower die array, and the other parallelogram strut being made using the upper die array having the same shape but rotated 180°.
Figure 25A:
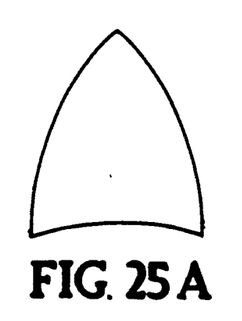
FIGS. 25A through 25D are cross-sectional views of alternate shapes for the parallelogram struts.
Figure 25B:
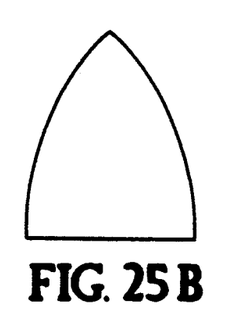
Figure 25C:
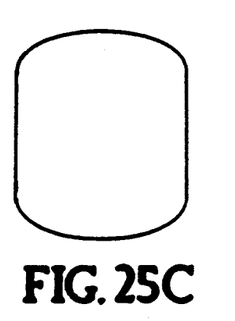
Figure 25D:
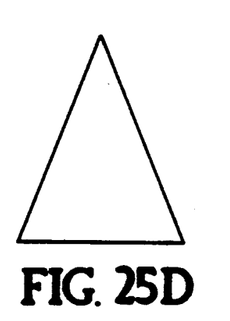

FIG. 24 depicts a top view of a parallelogram strut meeting another parallelogram strut at a parallelogram vertex. An upper parallelogram strut 78 is formed by the meeting of two upper dies and one lower die. A lower parallelogram strut 80 is formed by the meeting of two lower dies and one upper die. Struts 78 and 80 are connected such that they are identical in cross-sectional shape except that strut 78 is rotated 180° with respect to strut 80.

FIGS. 25A through 25D depict some alternate cross-sectional shapes for the parallelogram struts. The strut shape depicted in FIG. 25C, for example, is more difficult to make than the shape depicted in FIG. 23 because only two rounded corners are required to be milled in the design in FIG. 23. The struts' length, diameter, shape, and resin material may be varied depending upon the strength requirements of the particular application.

Figure 26:
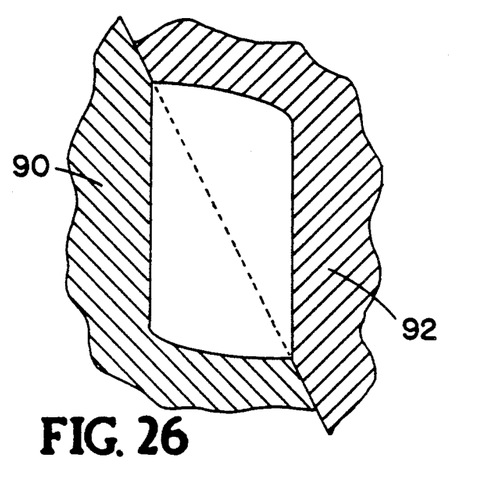
FIG. 26 is a drawing depicting the meeting of two grooved sides to form a horizontal strut.

Like the design of the parallelogram struts, the cross-sectional shape of the horizontal struts must be chosen so that the upper and lower molds may easily separate. In FIG. 26, two dies 90 and 92 have horizontal grooves that meet to form a horizontal strut.

Figure 27:
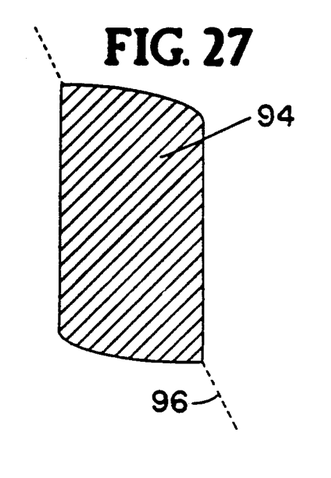
FIG. 27 is a cross-sectional view of the preferred shape for a horizontal strut.

FIG. 27 depicts a preferred cross-sectional shape of a horizontal strut 94. Horizontal strut 94 is formed by the meeting of two dies at line 96. The surfaces of both dies are grooved to form strut 94.

A primary advantage of the truss structure core according to the present invention is that it may be easily molded, drawn, or stamped from metal. In any of these processes, an array of adjacent tetrahexagonal dies are arranged with their bases on a flat plate to form one die array. This die array is then aligned with and moved close to an opposing but similar die array to create the truss structure. The core material is placed between the opposing die arrays to create the core.

Figure 29:
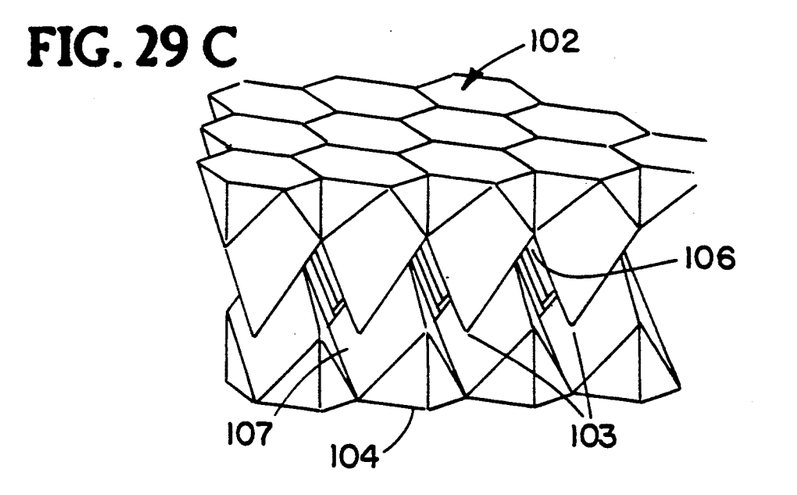
FIGS. 29A through 29D depict the sequence in which the upper and lower die arrays come together to make a core structure according to any of the above embodiments.
Figure 29A:
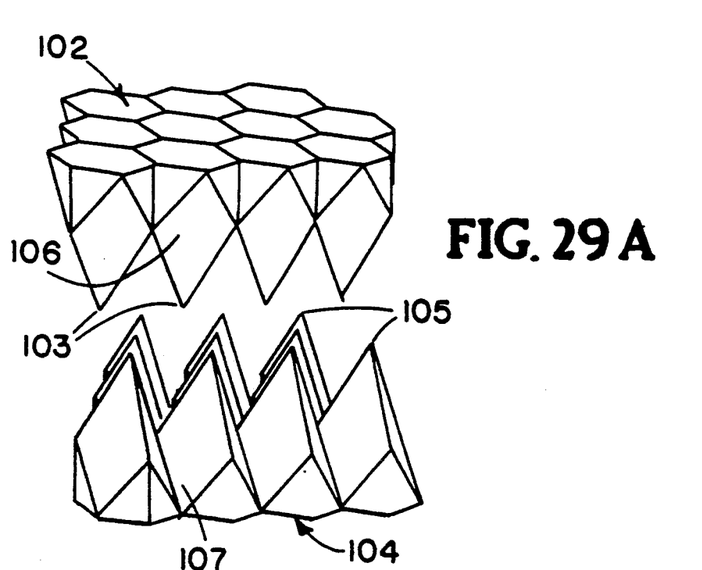
Figure 29B:
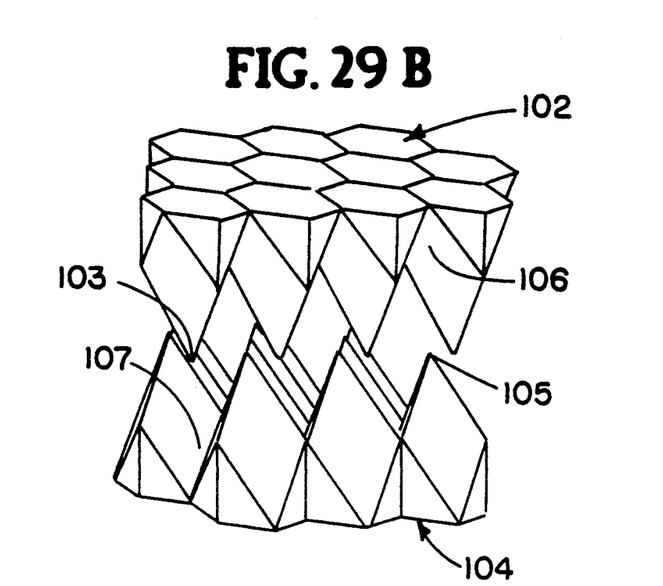

FIGS. 29A through 29D depict the sequence in which an upper die array 102 is positioned close to a lower die array 104 to create the truss structure core. In FIGS. 29A through 29C, the apices 103 of upper dies 106 are positioned close to, and aligned to fit in, the cavities between lower dies 107. Similarly, apices 105 of lower dies 107 are positioned close to and aligned to fit in the cavities between upper dies 106. If molten plastic is used as the core material, it is injected into the remaining spaces between dies 106 and 107 to form the core of the truss structure.

The die arrays depicted in FIGS. 29A through 29D may be made from individual dies that are cut from hexagonal bar stock and affixed to a plate in an array. The die arrays may also be cast from single blocks of metal by electronic discharge machining. The individual dies have the same shape regardless of whether the mold is created by electronic discharge machining or if they are individually made. The truss structure core may be made with an open mold, stamped, or drawn from metal because the entire surface area of each cavity in the core is the same as its outer surface area; there is no additional surface area in the interior of the cavities of the truss structure. The structure may be made out of any moldable or extrudable plastic. To make a curved structure, a flat core is made and then simply bent into the desired shape before the upper and lower skins are applied.

Figure 30:
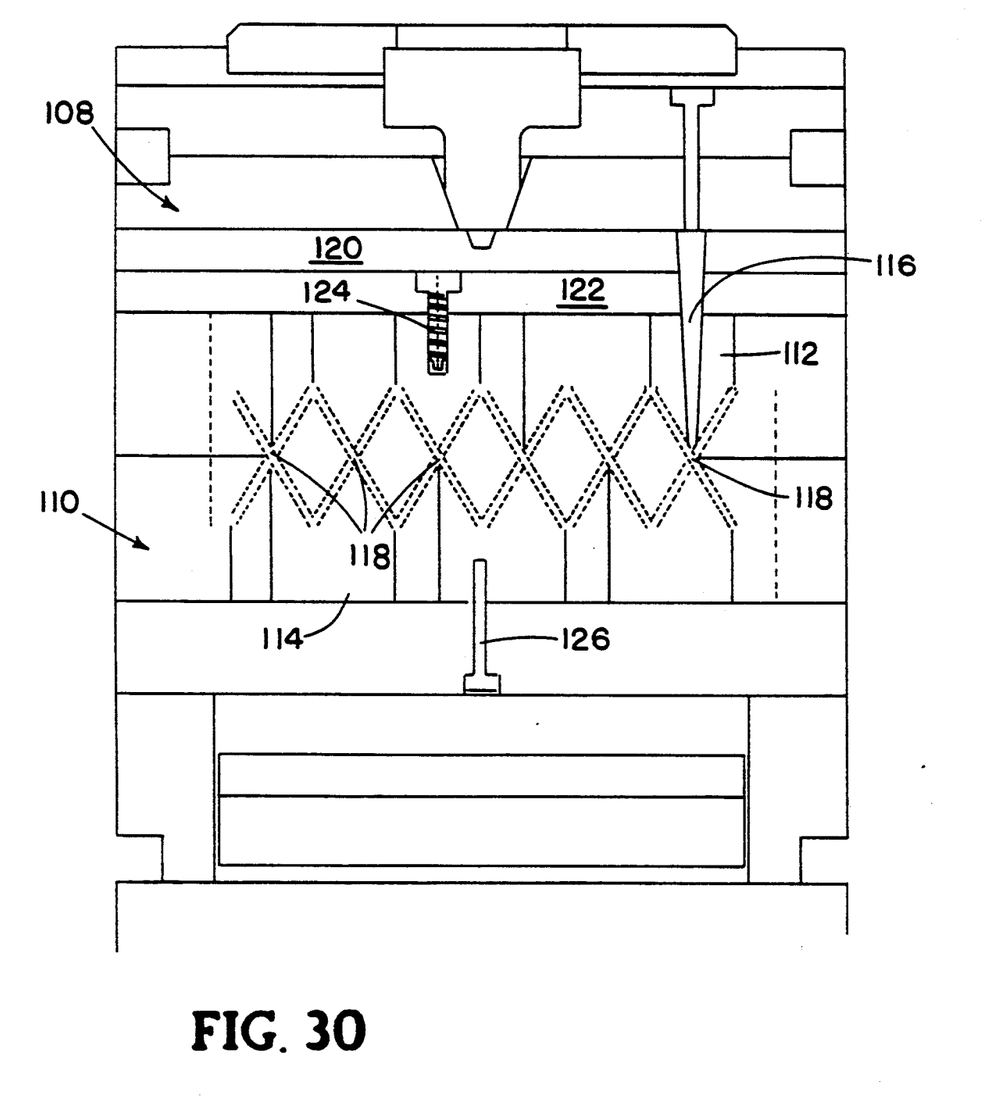
FIG. 30 is a side view of the jig used in making the core of the truss structure.

FIG. 30 depicts a jig assembly used to mold the truss structure having hollow walls. The jig assembly is comprised of an upper mold assembly 108 having an upper mold 112 comprised of an array of adjacent dies whose hexagonal bases are attached to an upper plate. The jig assembly also has a lower mold assembly 110 including a lower mold 114 having an array of adjacent opposing dies whose hexagonal bases are attached to a lower plate. The dies attached to both the upper and lower plates have milled parallelogram edges to permit plastic to flow between the parallelogram edges to create the parallelogram struts. The dies may also have milled first triangle edges and horizontal grooves to form the first triangle struts and horizontal struts, respectively.

Upper mold assembly 108 also includes a runner plate 120 that is used to distribute the plastic into the correct locations. Runner plate 120 has a vertical injection hole 116 in it for each twelve-point hub to be created in the truss structure. Molten plastic flows through injection holes 116 to twelve-point hubs 118, whereupon it is distributed in twelve directions to create the structure having parallelogram and horizontal struts.

To make the embodiments of the core having solid planar walls, dies without milled edges are used. Molten plastic flows across the lower mold 114, and is formed into the correct shape by positioning upper mold assembly 108 and upper mold 112. To stamp or draw the structure from metal, a sheet of metal is placed on lower mold 114 and formed into the correct shape by a compressive downward force applied to upper mold assembly 108.

After the core has been molded, stripper plate 122 pulls off the vertical columns of plastic from the upper mold resulting from the injection of plastic through injection holes 116. A spring assembly 124 causes the upper mold 112 and lower mold 114 to separate in the proper sequence. Ejection pin 126 then ejects the core out of the jig after the mold has separated by striking the core apices on the lower honeycomb array surface.

While particular embodiments of the invention have been shown and described, numerous modifications and alternate embodiments will occur to those skilled in the art. Accordingly, it is intended that the invention be limited only by the following claims.

What is claimed is:

1. A structure, comprising:
a plurality of adjacent cavities arranged in an array to form upper and lower array surfaces, each cavity having an apex and having hollow walls defined by a plurality of parallelogram struts, the shape of each cavity being that of a tetrahedron placed on top of and integrated with a base having at least three base vertices such that three hollow walls of the cavity are parallelograms each having four parallelogram vertices, a first parallelogram vertex of each parallelogram intersecting the apex of the tetrahedron, and the opposite second parallelogram vertex intersecting a base vertex; and
a plurality of horizontal struts, each of which joins third and fourth opposing parallelogram vertices of said parallelogram walls.

2. The structure according to claim 1, further comprising:
an upper skin affixed to the upper array surface; and
a lower skin affixed to the lower array surface.

3. A structure, comprising:
a plurality of adjacent cavities arranged in an array to form upper and lower array surfaces, each cavity including:
a base having at least three base vertices;
an apex located at the opposite end of the cavity from the base;
three hollow parallelogram walls, each wall being defined by four parallelogram struts arranged to form the sides of the parallelogram-shaped wall and intersecting to form four parallelogram vertices, the parallelogram walls being arranged so that a first parallelogram vertex from each parallelogram wall meets a first parallelogram vertex from each of the other two parallelogram walls to form the apex, and a second parallelogram vertex opposite to the first parallelogram vertex meets a base vertex; and
a plurality of horizontal struts, each of which joins third and fourth opposing parallelogram vertices of said parallelogram walls.

4. The structure according to claim 3, further comprising:
an upper skin affixed to the upper array surface; and
a lower skin affixed to the lower array surface.

5. The structure according to claims 1 or 3, further comprising:
base struts that connect adjacent base vertices.

6. The structure according to claims 1 or 3, wherein the base is a hexagon having six base vertices.

7. The structure according to claim 6, further comprising:
six hollow triangular walls, each triangular wall being defined by two triangle struts that form two sides of the triangular wall and by two base vertices, the triangular walls being arranged in pairs such that each pair has a common first triangle strut and the second triangle strut of each triangular wall is also a parallelogram strut.

8. A structure, comprising:
a plurality of adjacent cavities arranged in an array to form upper and lower array surfaces, each cavity having an apex and having solid walls formed between a plurality of parallelogram struts, the shape of each cavity being that of a tetrahedron placed on top of and integrated with a base having at least three base vertices such that three walls of the cavity are parallelograms each having four parallelogram vertices, a first parallelogram vertex of each parallelogram intersecting the apex of the tetrahedron, and the opposite second parallelogram vertex intersecting a base vertex; and
a plurality of horizontal struts, each of which joins third and fourth opposing parallelogram vertices of a parallelogram wall;
the solid walls being thinner than the parallelogram struts and the horizontal struts.

9. A structure, comprising:
a plurality of adjacent cavities arranged in an array to form upper and lower array surfaces, each cavity including:
a base having at least three base vertices;
an apex located at the opposite end of the cavity from the base;
three solid parallelogram walls, each wall being formed between four parallelogram struts arranged to form the sides of the parallelogram-shaped wall and intersecting to form four parallelogram vertices, the parallelogram walls being arranged so that a first parallelogram vertex from each parallelogram wall meets a first parallelogram vertex from each of the other two parallelogram walls to form the apex, and a second parallelogram vertex opposite to the first parallelogram vertex meets a base vertex; and a plurality of horizontal struts, each of which joins third and fourth opposing parallelogram vertices of a parallelogram wall;

the parallelogram walls being thinner than the parallelogram struts and the horizontal struts.

* * * * *